United States Patent [19]

Wolf et al.

[11] 4,342,464
[45] Aug. 3, 1982

[54] GASKET FOR A SOCKET-SPIGOT CONNECTION

[75] Inventors: Franz J. Wolf; Hansjörg Lauer, both of Bad Soden-Salmünster, Fed. Rep. of Germany

[73] Assignee: WOCO Franz-Josef Wolf & Co., Bad Soden-Salmünster, Fed. Rep. of Germany

[21] Appl. No.: 263,337

[22] Filed: May 13, 1981

[30] Foreign Application Priority Data

Jun. 24, 1980 [DE] Fed. Rep. of Germany ....... 3023619

[51] Int. Cl.³ .......................... F16J 15/10; F16J 15/32
[52] U.S. Cl. ................................ 277/207 A; 277/209; 285/110; 285/232; 285/237; 285/345
[58] Field of Search ....... 277/207 R, 207 A, 208–210, 277/165; 285/110, 230, 231, 232, 235, 237, 345

[56] References Cited

U.S. PATENT DOCUMENTS 3,774,920 11/1973 Sievenpiper .................. 277/165
4,174,125 11/1979 Wyss ............................. 285/110
4,229,028 10/1980 Gray ............................. 285/235

FOREIGN PATENT DOCUMENTS 1133412 11/1968 United Kingdom ........... 277/207 A

Primary Examiner—Robert S. Ward, Jr.
Attorney, Agent, or Firm—Jordan and Hamburg

[57] ABSTRACT

A gasket for a socket-spigot connection between a socket end and a spigot end of two pipes to be connected is made of a material stable as to its shape and adapted to carry at its inner radial side at least one resilient sealing ring and at its outer radial side at least one other sealing ring. The gasket has an outer diameter equal to or slightly less than the inner diameter of the socket and an inner diameter equal to or greater than the outer diameter of the spigot. The gasket has a radial inner ring groove and a radial outer ring groove, the radial inner ring groove being constructed and arranged to receive one of the seal rings to provide a pressure seal engagement between the one seal ring and the outer surface of the spigot, the radial outer ring groove being constructed and arranged to receive another of the seal rings to provide a pressure seal engagement between the other seal ring and the inside surface of the socket.

13 Claims, 2 Drawing Figures

GASKET FOR A SOCKET-SPIGOT CONNECTION

BACKGROUND OF THE INVENTION

This invention relates to a gasket for socket-spigot connections having a relatively wide sealing gap and relatively large work tolerance for the nominal width of the width of the sealing gap, in other words, for relatively large tolerances for the inner diameter of the socket and the outer diameter of the spigot end which must be sealed against each other when the socket-spigot connection is formed.

Such conditions occur particularly for socket connections of pipes made from mineral materials and having large nominal diameters.

Such mineral materials which have large tolerances are particularly fired or vitrified clay and concrete. Larger tolerances also result when manufacturing pipes made out of other mineral materials, for example, pipes consisting of fiber reinforced concrete and particularly asbestos cement.

For all such socket-spigot connections of pipes consisting of mineral materials, the problem of sealing the socket-spigot connection increases when the nominal diameter of the pipes increases. That is caused on one hand by the increasingly larger nominal breadths of the sealing gap, in other words, by the increasingly larger distance between the inner wall of the socket and the outer wall of the spigot end. Simultaneously, the absolute values of the tolerances of the sealing gaps increase, these tolerances resulting from the process of manufacture. The other cause is the increasing weight of the pipes which cause, independent of external additional loads, a considerable shear stress of the socket-spigot connection and thus a considerable strain vertical to the longitudinal axis of the pipes. When pipes are laid horizontally, for instance, the full weight of the spigot end lies at its lower area upon the lower area of the socket, thereby leading to high pressures, for example, on the rubber and elastic gasket in this area. In the oppositely disposed region of the socket connection, the deformation due to pressure and/or tension of the elastic-rubbery gasket is considerably reduced by the significant enlargement of the sealing gap. This leads to a noticeable reduction of the inner and outer pressure up to which the whole socket-spigot connection may be called an effective one. This reduction of the limiting pressure of tightness of the socket-spigot connection amounts in conventional gaskets, which may be used successfully with pipes with small nominal values, generally up to 100%. The sometimes effective and today generally used socket-spigot connections gasketted with rubber rings for small nominal diameters of pipes were not capable of being used for large nominal diameters of pipes due to the aforementioned problems. On the one hand, the profiles of the sealing rings must be so large due to the large standard breadths of the sealing gaps, that they would become extremely expensive for practical use due to the large amount of raw materials used. On the other hand, the known profiles of sealing rings, which were effective for small nominal values, would not be able to bridge manufacturing tolerance breadths of the sealing gap. When the profiles are dimensioned too generously, too large push-in forces are needed for the pushing in of the spigot end at the lower end of the tolerance range. These push-in forces are so high that they frequently cannot be exerted in fact, while too small dimensioned sealing rings are not capable to assure crown tightness of the socket connection even at low shear stresses. A profile of a sealing ring which satisfies the demands in both limiting ranges, in other words, for the smallest and for the largest sealing gap, demanded by the tolerances, is heretofore not known.

Many attempts have heretofore been published in order to solve the problems occurring particularly with socket-spigot connections of pipes made out of mineral materials and having larger nominal diameters. All attempts for practical use in this field seek to use instead of a single elastic sealing ring, a combination of inner and outer annular lip seals which are supported and stabilized by embedded or interdisposed jacket-shaped braces.

The most useful of such prior art devices is disclosed in Federal Republic of Germany DE No. 27 26 959 A1. Instead of a single elastomeric sealing ring, two such sealing rings are provided, one of them sealing at the inner wall of the socket, the other sealing the outer wall of the spigot end. The sealing rings are integrally connected to a sealing insert, substantially looking like a cylinder jacket by means of relatively thin and extendable ring bars, and the sealing insert also is relatively thin. This sealing insert also has a relatively thin reinforcement which resists bending. The sealing insert also has diminutions of the outer diameter into which the material of the sealing rings may press where the planes to be sealed are at radially narrow and most narrow distances.

A disadvantage of all embodiments of the basic idea in this prior art publication is that the whole breadth of the sealing gap and the whole tolerance of the sealing gap breadth must be substantially intercepted by the elasticity of the rubber. This known gasket is thus capable of solving the problem of material economisation but is not capable of solving substantially the problem of reducing the push-in force into the most narrow sealing gaps, while simultaneously assuring a high degree of pressure-resisting tightness at great shear stresses in the range of large and largest breadths of sealing gaps resulting from the manufacturing tolerances.

Considering this state of the art, an object of the present invention is to provide a gasket for a socket-spigot connection of the aforementioned type which is capable of improving the shearing resistance with a minimal use of material for the elastomeric sealing rings, particularly for socket-spigot connections between heavy pipes with large diameters, relatively broad sealing gaps and relatively large manufacturing tolerance for the breadth of the sealing gap, and which is capable of lowering the push-in forces needed for the spigot end to produce a pipe plug connection in the range of a sealing gap which might be narrow or extremely narrow as the tolerances dictate.

This objective is achieved by providing a gasket according to the invention for a socket-spigot connection consisting of a substantially cylindrical ring as a sealing insert, carrying on its outer wall at least one sealing ring sealing against the inner wall of the socket and carrying on its inner wall also at least one sealing ring sealing against the outer wall of the spigot end. The sealing insert is made out of a material which is stable in its shape and has a radial wall thickness equal to or slightly smaller than the smallest breadth of the sealing gap allowed by the manufacturing tolerance. "Slightly smaller" and "slightly larger" also relating to diameters means only negligible oversize or undersize of the noted size, which still permits free mutual sliding past of the respective parts, thus just the practically friction-free application of the sealing insert into the socket. This assures the practically friction-free setting of the spigot end into the sealing insert when the socket has the smallest inner diameter within the tolerance range and when the spigot end has the largest outer diameter within the tolerance range.

Annular grooves are provided on the sealing insert for accepting the sealing rings, the volume and profile of such grooves being so dimensioned that they are capable of containing completely an apportioned sealing ring and the sealing ring does not surpass a predetermined limiting value for tension deformation and material compression when it is completely pressed into the annular grooves.

Mainly when using lip rings, particularly spreading lip rings, the push-in forces may be kept extremely small even in a most narrow sealing gap, dictated by the tolerances, when the annular grooves in the sealing insert are shaped as aforedescribed. The broad radial dimensions of the sealing insert in relation to the sealing gap enables this form of stable sealing insert to immovably accept the whole shearing forces like a buffer already after a relatively short radial displacement of the spigot end relative to the socket or, in reverse, of the socket relative to the spigot end. Thus there is no need anymore to absorb occurring shear stresses by elastomeric means. In other words, the sealing rings may be built right away for much smaller deformation of material because the sealing rings do not have to intercept the shearing forces. Thus the sealing rings used for the invention may now make much more use of liptensions in order to exert the needed sealing pressure. A lowering of the needed minimum material distortion in favor of a larger share of lip tension in the sealing ring results not only in a greater saving of material, but reduces additionally and simultaneously the push-in forces needed in the region of the narrowest sealing gap. Sealing rings much thinner than in known gaskets may be used because the elastic sealing rings fulfill now only the sealing function and not the carrying of the load because the shearing forces are borne by the sealing insert itself.

The annular grooves provided in the inner wall and the outer wall of the sealing insert have preferably a generally flat V-shaped profile and serve to accept the sealing rings which have V-shaped profiles looking in the same direction. The included angle of the profile of the sealing rings is smaller than the included angle of the annular groove profile. The included angle of the profile of the sealing rings lies preferably in the area of approximately 90°.

The sealing ring may be fastened to the bottom of the sealing groove by aid of its base area, in other words the area radially opposed to the area enclosed by the V-shaped lips. It may, for example, be glued on, be an integral part, or may be clamped on by clamping means or may be shaped like a circular bead in the base area and may abut in a T-slot which has a complementary profile and is located in the bottom of the groove. The base area of such a spreading lip-ring may also have a rectangular, square or any other cross section and may be laid, glued or clamped into a T-slot in the base of the groove having a complementary profile. When the base area of the sealing ring has a circular bead shape and when the annular groove has a circular profile, an articulating effect results between the sealing ring disposed in this annular groove and the sealing insert. This articulating effect allows swivelling of the sealing ring in an optimal position. In such a case the annular T-slot in the base of the flat V-shaped annular groove is preferably slightly and axially one-sided undercut. It is undercut in the radially inside lying annular groove of the sealing insert at the side looking towards the socket base and in the radially outside lying annular groove of the sealing insert at the side looking towards the socket opening. The result of this construction is that the articulatingly disposed spreading lip sealing rings are fixed against any axial displacement when the sealing insert is put into the socket or when the spigot end is pushed into the sealing insert, respectively.

Additional stabilization of the gasket may be obtained by integrally forming an annular inner flange at the front side of the sealing insert considered looking towards the socket base. The free inner diameter of that flange is distinctly smaller than the smallest outer diameter of the spigot end (within the range of the manufacturing tolerance) and slightly larger than or at least as large as the largest inner diameter (within the range of the manufacturing tolerance) of the spigot end of the socket-spigot connection to be prepared according to the specifications. This relationship assures that the frontal side of the spigot-end sits within its whole tolerance range upon the annular plane of the inner flange of the sealing insert which faces towards the socket opening and that the sealing insert is thereby stabilized and fixed.

According to one embodiment of the invention, the sealing insert has preferably a complete axial length at least substantially equal to the depth of the groove, in other words equal to the distance between the rim of the socket opening and the socket base. Due to the fact that these axial dimensions are frequently not very large and the V-shaped ring grooves require axially relatively large spaces, the ring grooves are preferably disposed in the sealing insert in such a manner that adjacent or neighboring legs, respectively, of each individual either radially inwardly open or radially outwardly open ring groove overlaps to a large extent or completely in a radial projection. The degree of overlap must be evident so that enough material remains in the area of the dividing walls so that the stability of the sealing insert is assured.

The sealing insert itself may consist in principle of any form of stable material, for instance metal, ceramic, plastic or reinforced plastic. The sealing insert consists preferably of such materials which may be manufactured at low price and with relatively good precision. The sealing insert consists preferably of a plastic, a mainly fiber-reinforced plastic or of relatively hard compounded elastomers. When the sealing insert consists of elastomers, the softer compounded sealing rings are preferably integral parts of the sealing insert or they are molded on.

When the sealing insert has an inner flange, resting upon the socket base, this inner flange may have, for improved tightening, additional sealing parts working frontally on one or both of its surfaces. They may be, for instance, molded-on sealing beads, interposed O-rings or molded-on annular lips.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
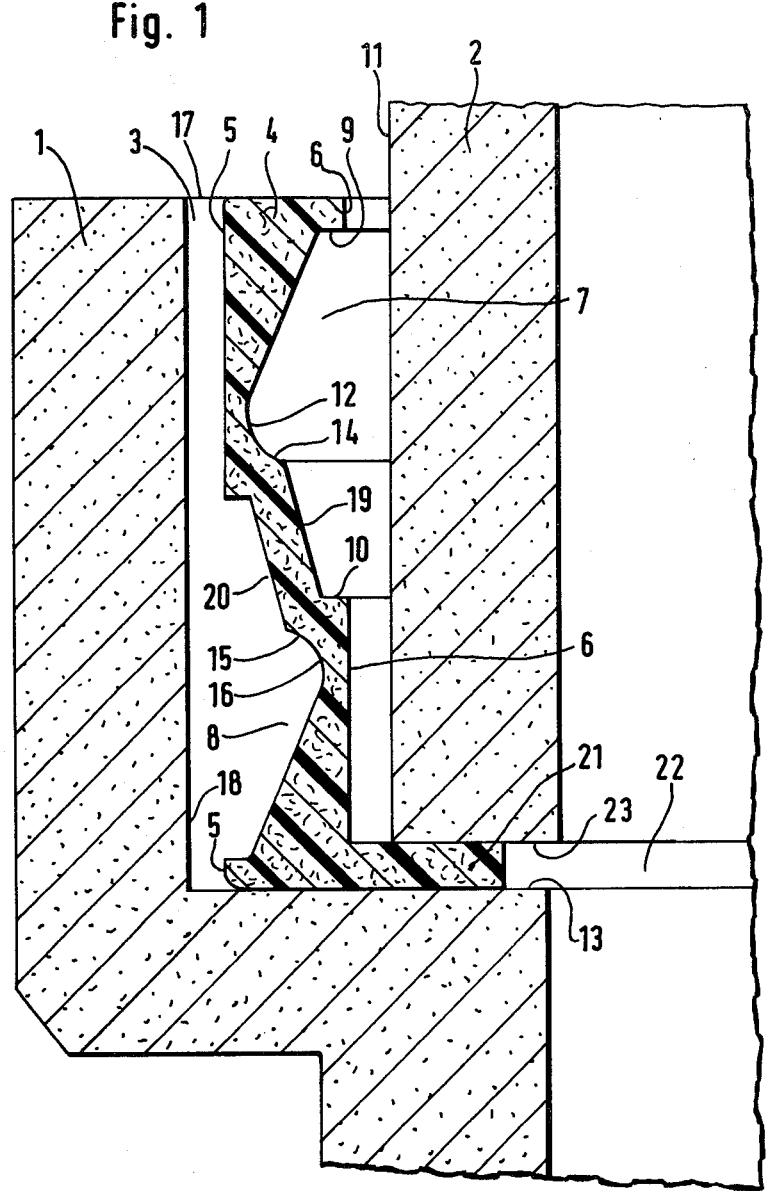
FIG. 1 is a partial cross sectional view, taken along an axial plane, of a gasket for a socket-spigot connection according to one embodiment of the invention.

Referring to the drawing, FIG. 1 shows an axial section of a gasket according to one embodiment of the invention. FIG. 1 shows a socket end 1, a spigot end 2 and a ring-shaped sealing insert 4 within the ring gap or sealing gap 3 between socket end 1 and the spigot end 2. FIG. 1 shows the case where the breadth or thickness of the sealing gap 3 lies at the upper limits of tolerance.

The breadth of sealing insert 4, in other words its wall thickness, measured between its cylindrical outer wall 5 and its cylindrical inner wall 6 corresponds to the narrowest breadth of the sealing gap 3 permitted by the tolerance. A radially inwardly open ring groove 7 and a radially outwardly open ring groove 8 are provided on the sealing insert 4. The cross sectional configuration of ring groove 7 opens radially inwardly, substantially in the form of a very flat V-shape. The ring groove 7 is limited at both its opposing outer ends by radially disposed circular ring planes 9 and 10 which accept pressure free the lip rims of a spreading lip seal ring which has a generally V-shaped configuration in its profile when the outer surface 11 of spigot end 2 abuts immediately the inner wall 6 of the sealing insert 4. In order to allow easier visualisation, the sealing ring proper is not shown in FIG. 1. The V-shaped sealing ring is provided with a smaller included angle, for example in the order of about 90° when in a relaxed or natural state. When the spigot end 2 is pushed into the socket end 1, the two lips of the sealing ring abut the outer surface 11 of the spigot end 2, once in an axially outward position and once in an axially inward position, while being tensed for spreading. The base area of the sealing ring lying radially outwardly and opposing both sealing lips and the angle described by them is disposed packingly in a hollow flute 12 which is formed in the base of ring groove 7. Flute 12 has on its axial side looking towards the socket end 13 a shallow undercut 14 which prevents the sealing ring (not shown in FIG. 1) from being pushed axially out of the ring groove 7 when the spigot end 2 is pushed in.

Ring groove 8 has practically the same shape as ring groove 7 and the only difference is that it opens radially outwardly instead of inwardly and the undercut 15 of hollow flute 16 is disposed upon the side of the hollow base 16 which looks towards the socket opening 17. The also not shown V-shaped sealing ring packs with its spread sealing lips the inner wall 18 of socket 1.

The axial length of sealing insert 4 equals the depth of the socket measured from the rim of opening 17 to the socket base 13. In order to provide space for the broad openings of the two V-shaped ring grooves 7 and 8 considering the relatively short axial length, the legs 19, 20 of ring grooves 7 and 8 are disposed opposite to one another and are arranged overlappingly in the radial direction as shown in FIG. 1.

The sealing insert 4 has at its frontal side which faces towards the socket base 13, a one-piece molded-on or integral toroidal inner flange 21. The inner diameter of inner flange 21, measured across its inner cylindrical surface along inner plane 22, is definitely smaller than the smallest (within manufacturing tolerance) outer diameter of the spigot end 2 and also is slightly larger than the largest (within the manufacturing tolerance) inner diameter of the spigot end 2. With this arrangement the sealing insert 4 is forced, by way of its molded-on inner flange 21 being engaged by the frontal ring plane 23 of the spigot end 2, onto the ring plane of socket base 13, and thereby is stabilized and axially fixed.

Figure 2:
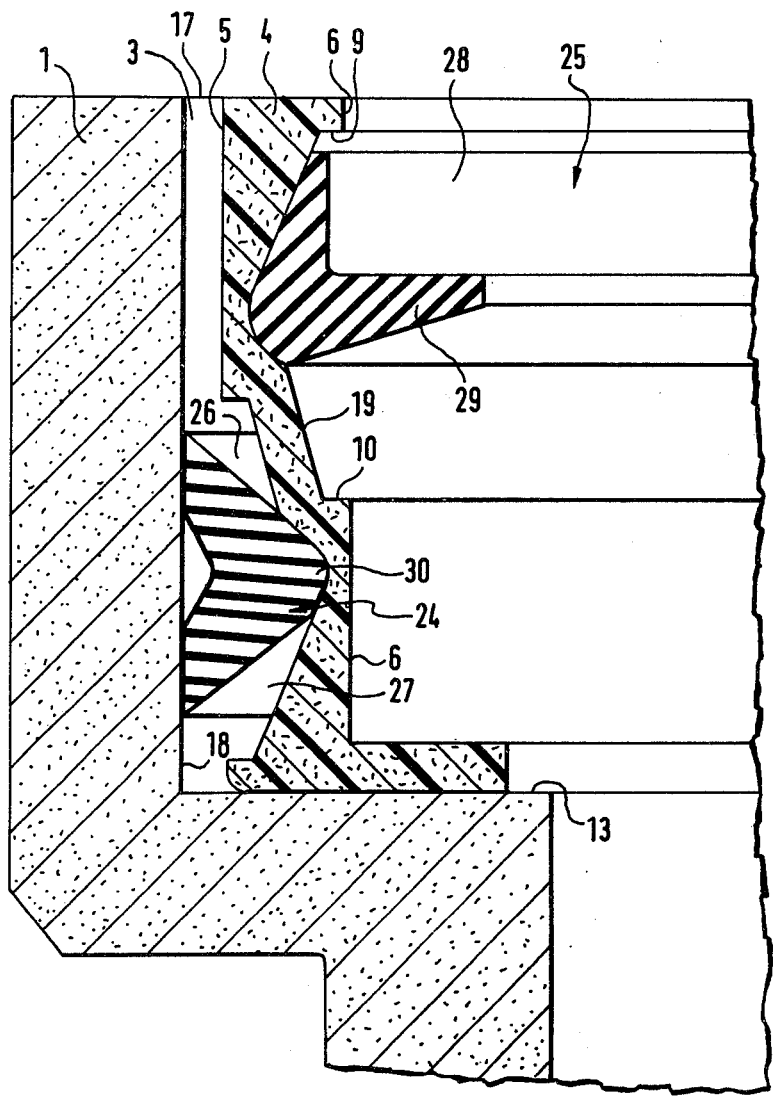
FIG. 2 is a partial cross sectional view as shown in FIG. 1 with the spigot removed and the sealing rings inserted.

Referring now to FIG. 2 of the drawings there is shown an axial section of a gasket according to one embodiment of the invention and of the type as shown in FIG. 1. In contrast to the representation in FIG. 1, however, the radially outer sealing ring 24 and the radially inward sealing ring 25 are shown. The radially inward sealing ring 25 is shown in the condition before inserting the spigot end 2 (cf. FIG. 1). Said sealing rings 24, 25 are made of rubber. Each of the sealing rings 24, 25 comprises two sealing lips 26, 27 and 28, 29, respectively, which lips 26, 27 and 28, 29, respectively, are arranged to form a V-shape in the cross sectional view of the sealing ring as shown in FIG. 2. In the non-stressed state sealing rings 24 and 25 have the like structure and form, apart from sealing ring 24 having its V opening radially outwardly, while sealing ring 25 has its V opening radially inwardly. In FIG. 2, however, sealing ring 24 is shown in its operational state, i.e. in its stressed state sealingly abutting the inner walls 18 of the socket 1, whereas sealing ring 25 is shown in the state before pushing in the spigot end 2. Before inserting the ring shaped sealing insert 4 into the socket 1, sealing ring 24 in its pre-assembled unstressed state has its lip 26 pointing mainly radially outwardly, whereas lip 27 of the sealing ring 24 is positioned axially, pointing axially inwardly. Thus, lip 26 of ring 24 corresponds to lip 29 of ring 25, while lip 27 of ring 24 corresponds to lip 28 of ring 25 pointing just to inverted direction. Upon inserting the ring shaped sealing insert 4 provided with the sealing ring 24 into the socket 1, sealing ring 24 is tilted or turned over through its main radial plain in a clockwise direction of rotation so as to then adopt its sealing position as shown in FIG. 2. It is obvious from FIG. 2, that lip 26 of ring 24 is abutting the inner surface 3 of socket 1 in sealing engagement so as to provide a sealing action against outer pressure, that lip 27 of ring 24 is abutting the inner surface 3 of the socket 1 in sealing engagement so as to provide a seal against inner pressure, and that route 30 of ring 24 situated opposite to the angle as enclosed between lip 26 and 27 is in sealing engagement with the outer surface of groove 8 of the ring shaped sealing insert 4 sealing against inner and outer pressure, simultaneously. When pushing in a spigot in the socket provided with sealing insert 4 and sealing ring 25, the endside of the spigot will hit upon lip 29, more precisely on its axially outwardly facing surface, and, upon being further pushed inside the socket, the spigot will turn or tilt ring 25 in a clock-wise direction so as to adopt a position corresponding to the position as shown for ring 24 apart from lips 28 and 29 being straddled in a axially inwardly spreading manner rather than in an axially outwardly spreading manner as shown for ring 24 in FIG. 2.

It is emphasized, however, that the gasket of the invention is not limited to the use in combination with sealing rings as shown in FIG. 2. Any other sealing ring and groove combination as known per se might be as well accommodated in a ring shaped sealing insert as shown under reference numeral 4 in FIGS. 1 and 2. Such modifications are obvious for those skilled in the art.

What is claimed is:

1. A gasket for a socket-spigot connection between a socket end and a spigot end of two pipes to be connected, said gasket being of a material stable as to its shape and being adapted to carry at its inner radial side at least one resilient sealing ring and at its outer radial side at least one other sealing ring, said gasket having an outer diameter equal to or slightly smaller than the inner diameter of said socket, said gasket having an inner diameter equal to or greater than the outer diameter of said spigot, said gasket having a radial inner ring groove and a radial outer ring groove, said radial inner ring groove being constructed and arranged to receive one of said seal rings to provide a predetermined maximum pressure engagement between said one seal ring and the outer surface of said spigot, said radial outer ring groove being constructed and arranged to receive another of said seal rings to provide a predetermined maximum pressure engagement between said other seal ring and the inside surface of said socket.

2. A gasket according to claim 1 wherein said radial inner ring groove is adapted to completely receive said one seal ring upon deformation of the latter from its natural state and to provide said maximum sealing pressure when said one sealing ring is completely received in said radial inner ring groove, said radial outer ring groove being adapted to completely receive said other sealing ring upon deformation of the latter from its natural state and to provide said maximum sealing pressure when said other sealing ring is completely received in said radial outer ring groove.

3. A gasket according to claim 1 wherein said gasket insert is constructed in arrangement to fit into the annular sealing space between the inner surface of the socket and the outer surface of the spigot for all diameters of the inside of said socket and the outside of said spigot within manufacturing tolerances thereof such that the gasket insert will fit into such annular space for the largest diameter spigot and the smallest inner diameter socket.

4. A gasket according to claim 1 wherein said radial inner ring groove and said radial outer ring groove each have a generally V-shaped configuration, said radial inner ring groove having one leg portion of its V at least partially overlapping with one leg portion of the V of the radial outer ring groove.

5. A gasket according to claim 1 wherein said radial inner ring groove and said radial outer ring groove each have a generally V-shaped configuration, said radial inner ring groove having one leg portion of its V completely overlapping with one leg portion of the V of the radial outer ring groove.

6. A gasket according to claim 1 wherein said sealing rings have a generally V-shaped configuration with an included angle of approximately ninety degrees and having a generally rounded base portion, said radial inner ring groove and said radial outer ring groove each having a generally V-shaped configuration each with generally rounded base portions which receive the correspondingly rounded base portions of said sealing rings.

7. A gasket according to claim 6 wherein said base portions of said inner and outer V-shaped ring grooves are provided with an undercut at one side of the V.

8. A gasket according to claim 7 wherein said undercut in said radial inner V-shaped ring groove is provided on the side of the V closest to the base of the socket, and said undercut in said radial outer V-shaped ring groove is provided on the side of the V furthest from the socket base.

9. A gasket according to claim 1 wherein said sealing rings are integrally formed with said gasket insert at said ring grooves.

10. A gasket according to claim 1 wherein said sealing rings are secured by adhesive to the respective ring groove.

11. A gasket according to claim 1 wherein said sealing rings are clamped to the respective ring groove.

12. A gasket according to claim 1 wherein said gasket insert is provided with an annular flange having an inner diameter less than the least outer diameter of said spigot and equal to or larger than the largest inner diameter of said spigot within the manufacturing tolerance thereof.

13. A gasket according to claim 1 wherein said gasket insert has an axial length which is at least equal to the distance between the base of the socket and the terminating longitudinal end of the socket.

* * * * *